UNITED STATES PATENT OFFICE.

RALPH R. ADAMS, OF YONKERS, NEW YORK.

PAINT.

1,317,469. Specification of Letters Patent. Patented Sept. 30, 1919.

No Drawing. Application filed October 5, 1917. Serial No. 194,866.

*To all whom it may concern:*

Be it known that I, RALPH R. ADAMS, a citizen of the United States, and a resident of Yonkers, county of Westchester, State of New York, have invented new and useful Improvements in Paints, of which the following is a specification.

This invention relates to improvements in paints and has for its object to provide a paint having advantages, particularly for marine purposes, not possessed by paints of ordinary composition.

My invention is based upon the discovery that wool grease may be used in the manner hereinafter described as an oleaginous ingredient of the paint, adding greatly to the adhesive qualities of the paint and also adding to its flexibility and luster.

My improved paint may also be so prepared that it will "dry" under water, making it suitable for use on ship bottoms, bridge pilings, etc., without dry-docking the ship or placing caissons around the piling as is now necessary when normally submerged structures are to be painted.

In preparing my improved paint I use a partially refined wool grease, preferably one which has been bleached and with the soluble and the volatile impurities removed, but not necessarily so refined as the so-called lanolin of pharmaceutical preparations.

At ordinary temperatures, wool grease is of a pasty consistency, and the pigment may be ground directly into it or the grease may be heated until it is sufficiently thin to stir into it previously ground pigments after the manner in which they are stirred into the usual oils. The pigment-containing grease is then emulsified with some suitable diluent, for instance, turpentine or benzin, in sufficient quantity for the resulting paint to be thin enough to spread with a brush or by an air spray.

The wool grease, or lanolin, possesses distinct adhesive qualities which cause the paint to adhere without penetration so that the paint is particularly applicable to metal, glazed and other non-porous surfaces, where ordinary paint, which depends upon capillary penetration for its adhesion, does not stick.

The wool grease does not oxidize or dry into a hard film like ordinary oil paint, and the dried paint is therefore quite flexible and is advantageous for surfaces subject to distortion, such as vehicle springs, as it does not scale off in a short time.

My improved paint dries with a marked luster without using ordinary resins or varnish oils commonly employed to give an enamel finish to ready-mixed paints.

My improved paint is particularly useful for submerged surfaces. It is a peculiar property of wool grease that it will take up a certain amount of water but is not soluble in water, and will not itself absorb more than this predetermined amount. By using an anhydrous wool grease or one which has not its full water content, the paint may be applied directly to the wet surface, for the wool grease will absorb the water, in effect drying the surface so that the paint actually adheres to the surface of the material itself. Due to its adhesive properties the paint will stick to the surface even when applied under water, whereas ordinary paint, while not miscible in water, will be washed off the surface before it can dry, even assuming that it could be successfully applied in the air to a wet surface.

I preferably prepare my improved paint of the three ingredients only, namely, the wool grease or lanolin, pigment, and the diluent, but if desired ordinary drying oils may be added in small quantities to give a harder surface. Also the pasty consistency of the wool grease may be partially reduced by working into it ordinary paint oils.

I claim:

1. A paint comprising natural wool grease from which impurities and foreign matter have been partially removed as an oleaginous ingredient.

2. A paint comprising natural wool grease, a pigment and a diluent.

3. A paint comprising natural wool grease, a pigment and a volatile diluent.

Signed at New York, in the county of New York and State of New York, this 21st day of August, 1917.

RALPH R. ADAMS.

Copies of this patent may be obtained for five cents each, by addressing the "Commissioner of Patents, Washington, D. C."